Oct. 27, 1959     J. S. MEYERS     2,910,115
SPRING STRUCTURE

Filed June 2, 1958     2 Sheets-Sheet 1

INVENTOR
John S. Meyers
BY Beaman & Beaman
ATTORNEY

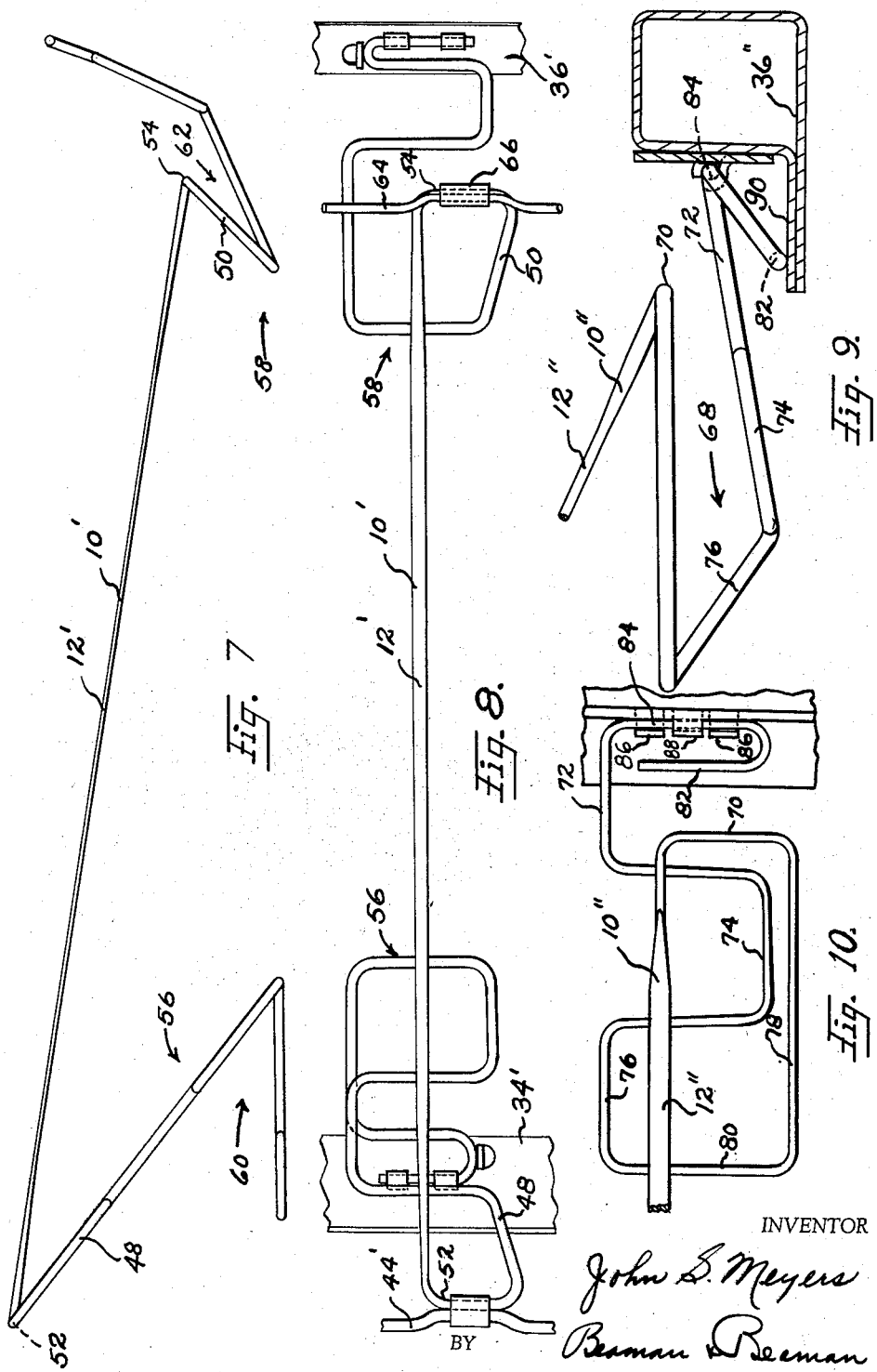

United States Patent Office 2,910,115
Patented Oct. 27, 1959

2,910,115

SPRING STRUCTURE

John S. Meyers, Allen Park, Mich., assignor to Stubnitz Greene Corporation, Adrian, Mich., a corporation of Michigan Application June 2, 1958, Serial No. 739,059

5 Claims. (Cl. 155—179)

The present invention relates to improvements in spring elements designed to be assembled on the frames of resilient seats and backs used in vehicles, furniture, auditorium seating and the like, being particularly concerned with spring elements which extend from front to back of seats and from top to bottom in backs to provide resilient cushions.

For many years so-called zig zag spring elements have been used in resilient cushions as shown in Patent No. 2,133,611. These elements are disposed in spaced parallel arrangement to collectively define a resilient surface upon which a suitable pad or insulator is disposed to give support to the upholstery over and between the spring elements. As further disclosed in said patent, it has been long proposed in order to provide the necessary depth to the cushions to form the zig zag spring elements at their ends and adjacent the frame into torsion columns of fish mouth or other suitable form.

As disclosed in Reissue Patent No. 21,263 and Patent No. 2,631,029, it has been the practice to set the zig zag spring element on an arc so that the spring element, or a portion thereof when unsupported, would form a circle or a part of a circle of predetermined radius. In applying this type of spring to the frames of seats and backs, the ends of the spring elements are sprung out to engage the sides of the frames and the curvature of the arc defined by the spring element when support is reduced.

In contrast to the disclosure of the aforesaid patents, in the case of the present invention the spring element has adjacent oppositely opening U-shaped bends at the ends only to define the torsion columns adjacent the point of attachment with the sides of the frame. Between the torsion columns, the spring elements are defined by linear spring portions which are substantially straight except for a slight crown extending from end to end and are preferably of flattened cross-section in contrast to the circular cross-section of the wire used in the fabrication of the torsion columns. When the spring elements, according to the invention, are out of the frame and unsupported, the linear spring portions are substantially straight. However, upon inserting the spring elements into the frames a slight crown from end to end results at the time the torsion columns are attached to the side frames. When a load is applied to the surface of the cushion the curvature of the crown of the linear spring portions is first reduced, setting up torsion in the torsion column structures. When the load is removed the crown of the linear spring portions is restored and the surface of the cushion is returned to its original contour.

The linear spring portions of my improved spring elements by being straight require a minimum of wire in their fabrication. As a result, under deflection, a functional addition of wire is required to provide the desired resilient supporting action of linear spring portions and to avoid objectionable inward deflection of the inner and outer border frames as well as to distribute the load stresses along the spring element. This functional addition of wire to the linear spring portions has been accomplished by the unique manner in which the linear spring portions are suspended from the torsion columns as will be described in detail in the following specification.

Thus, one of the objects of the present invention is to provide an improved spring element having a central linear spring portion and end torsion columns defined by adjacent oppositely directed U-bends.

Another object is to provide an improved spring element as defined in the preceding paragraph in which the linear spring portions are disposed in balanced relation to the torsion columns at opposite ends thereof.

Another object of the invention is to provide a spring element of the type described in which a functional addition of wire is provided upon deflection of the linear spring portion.

These and other objects and advantages present will appear in detail from the following specification and the appended claims.

In the drawings,

Fig. 7 is a view similar to Fig. 1 of a modified form of spring element, Fig. 8 is a view similar to Fig. 3 of the form shown in Fig. 7.

Fig. 9 is a fragmentary side elevational view of a further modification having a terminal torsion bar, and Fig. 10 is a plan view of Fig. 9.

Figure 1:
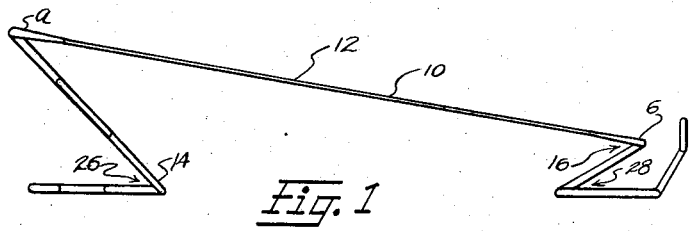
Fig. 1 is a side elevation of a spring element in its unstressed position.

In Figs. 1 to 6, inclusive, is shown one commercial form the present invention has taken to obtain the objects set forth above. As shown in side elevation in Fig. 1, the spring element 10 is in a relaxed dismounted state. The spring element 10 is fabricated from a continuous length of spring steel wire. Between the points *a* and *b* a straight portion of wire defines a linear spring portion 12. Preferably, the wire from which the element 10 is formed is of circular cross section except between the points *a* and *b* where the cross section has been flattened to reduce the thickness of the wire in the plane of deflection of the linear spring portion 12 in service. The amount of flattening will be determined by loading and riding conditions. In practice, for example, with the spring element 10 being fabricated from high carbon spring steel of approximately .148" diameter round wire, this wire is flattened between the points *a* and *b* to a thickness of approximately .087" in the plane of deflection and a width of approximately .195" normal thereto. Such a spring element would be suitable for the seat cushion of a vehicle with the spring elements 10 being disposed in parallel, front to back arrangement on 3¼" centers.

At opposite ends of the linear spring portion 12 and beyond the points *a* and *b* round portions of the wire are formed into torsion structural portions generally designated 14 and 16. As more clearly shown in Fig. 4, terminal transverse torsion bars are provided at 18 and 20 and integral therewith a series of oppositely directed U-loops 22 and 24, are disposed to define "fish mouth" configuration generally indicated at 26 and 28. End attachment bars 30 and 32 for the portions 14 and 16 are provided for connection to the seat frame.

Figure 2:
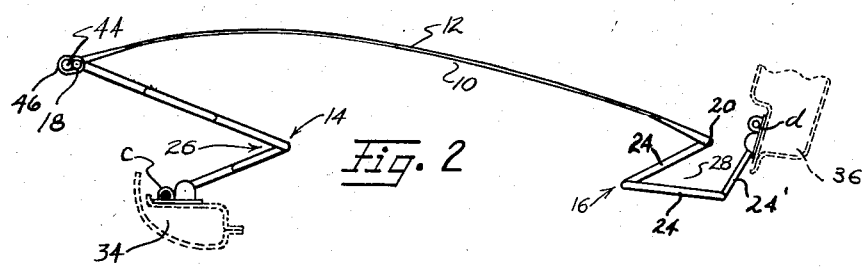
Fig. 2 is a view similar to Fig. 1 showing the spring element slightly crowned as positioned in the frame.

In Fig. 2, the spring element 10 is shown disposed in the position which it assumes when the end attachment bars 30 and 32 are moved toward each other to their points of attachment c and d upon the frame portions 34 and 36 indicated in dotted outline. When compared to Fig. 1, it will be noted that movement of the bars 30 and 32 toward each other places a crown in the linear spring portion 12 and slightly shifts the portions 14 and 16 relative to each other.

Figures 5, 6:
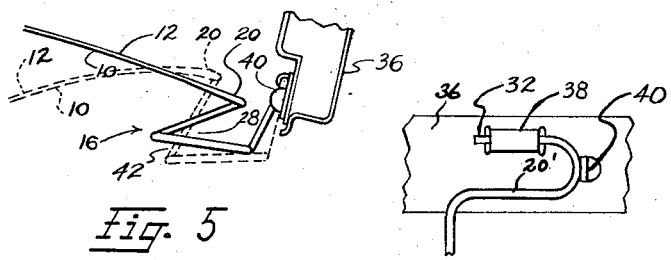
Fig. 5 is a side elevational view of the suspended end of the spring element.
Fig. 6 is a detail view of the terminal attachment of the spring element with the frame.

Referring to Figs. 5 and 6, the bar 32 is supported in capsules 38 formed out of the surface of the sheet metal frame portions 34 and 36 and held in place by stops 40 formed from and bent up out of the face of the frame portion 36. With the bar 32 thus attached the torsion structure 16 defining the fish mouth is "suspended" from the frame 36 whereas the torsion structure 14 defining the fish mouth 26 is "resting on" the frame portion 34. The characteristics of the torsion structures 14 and 16 as "suspended" and "resting on" the frame portions 34 and 36 is founded on the fact that the torsion bar 18 is disposed outwardly beyond the end bar 30 whereas the torsion bar 20 is disposed inward of the end bar 32. With this arrangement, upon substantial deflection of the linear spring portion 12 the torsion structure will move toward the dotted outline position of Fig. 5 with the torsion bar 20 shifting to the left with pronounced "hinging" taking place about the axis of the torsion bar 42. In this manner, a functional addition of wire to the linear portion 12 takes place to distribute the stresses and provide better control of the torsion structure 14 by reducing the tendency thereof to rock clockwise about the bar 30.

It will be understood that in a seat cushion, the torsion structure 14 provides support for the thighs of a seated person and substantial movement of the torsion bar 18 toward the frame portion 36 is objectionable. In practice, the top border frame 44 of the cushion spring structure is attached to the torsion bar 18 by a suitable clip 46, as shown in Fig. 4.

Under a load deflection of spring portion 10 rocking of the torsion structures 14 and 16 about the end bars 30 and 32 will take place clockwise and counter-clockwise, respectively. When the transverse bar portions 18' and 20' abut the faces of the frames 34 and 36, further deflection will cause the portions 18' and 20' to function as terminal torsion bars.

Figure 3:
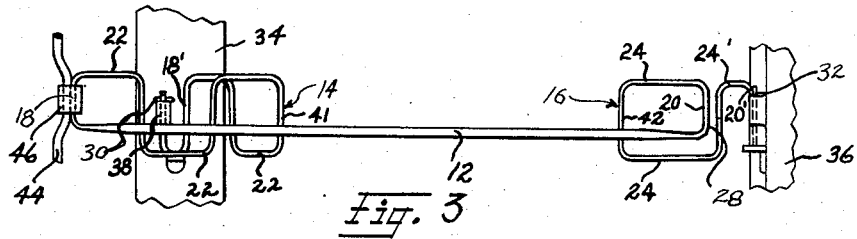
Fig. 3 is a plan view of Fig. 1.

In Fig. 3, the relationship of the linear spring portion 12 to the torsion structures 14 and 16 is shown. It will be noted that the portion 12 is in an off-set relation. In comparison, in Figs. 7 and 8 an "on center" arrangement of the linear spring portion 12' has been obtained by slightly angling the portions 48 and 50 adjacent the torsion bars 52 and 54.

Figure 4:
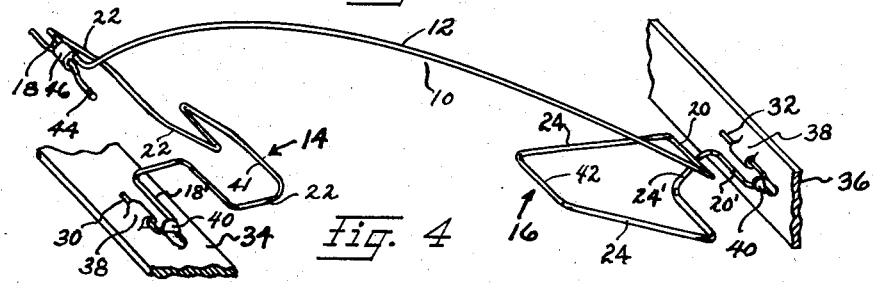
Fig. 4 is a perspective view of a spring element attached in the upper and lower frame structures.

In Fig. 8, the spring element 10' of Fig. 7 is shown disposed between the frames 34' and 36' in a manner similar to that shown in Fig. 4. The terminal end structures generally designated 56 and 58 are composed of oppositely directed loop portions which define the fish mouths 60 and 62. It will be noted from Fig. 8 that with regard to the structure 56 and 58 the spring portion 12' is "on center."

Whereas the form of the invention shown in Figs. 1 to 6, inclusive, shows the use of the frame 44 only at the front of the seat construction, in Fig. 8 the frame 64 is shown clipped at 66 to the torsion bar portion 54.

In Figs. 9 and 10 is shown a modification in which the torsion bar portion at the terminal support of the spring element 10" is located at the point of attachment with the frame 36". As shown, the linear spring portion 12" has a junction with the terminal torsion structure, defining the fish mouth 68, through the common transverse torsion bar portion 70. The terminal torsion structure comprises oppositely facing U-loops 72, 74 and 76, a portion 78 extending between the legs 80 of the U-loop 76 and the torsion bar portion 70, and the L-shaped end portion 82.

The leg 84 of the U-loop 72 constitutes the torsion bar portion located at the terminal support of the spring element 10". As shown, the leg 84 is supported on ledges 86 which may be conveniently formed from the frame 36". To hold the leg 84 upon the ledges 86, a member 88 likewise formed from the frame 36" may be employed. As an integral extension of leg 84, the L-shaped end portion 82 is located in a plane angularly disposed to the plane of the U-loop 72, as shown in Fig. 9. It will be noted that the end portion 82 abuts the extension 90. With this arrangement, a load upon the spring portion 12" will tend to rotate the U-loop 72 counter-clockwise around the leg 84 as a pivot. However, the abutment between the portion 82 and the extension 90 will cause the leg 84 to function in the capacity of a torsion spring bar.

To better define the present invention and the appended claims, the linear spring portion 12, being that part of the cushion spring structure which gives direct support to the load, is described as the load supporting structure. Also, while the torsion structure 14 is defined as being at the front and the torsion structure 16 at the rear, in the back structure of a seat, the structure 14 would actually be at the top and the structure 16 at the bottom. Similar situation exists in regard to the description of the frame portions 34 and 36 as front and rear. To define over-sinuous type spring elements, the linear spring portion 12 is described as being entirely disposed in the plane of deflection. The fish mouth structures 26 and 28 are defined by intersecting planes, normal to the plane of deflection of element 12, in which the loops 22 and 24 are disposed. In defining the fish mouth 26, the torsion bar 41 is disposed at the point of intersection of the plane in which the loops 22 are disposed while the torsion bar 42 is disposed at the point of intersection of the plane in which the loops 24 are disposed to define the fish mouth 28. The loop 24' constitutes the suspension extension portion of the fish mouth 28 defined by the loops 24. Characterization of the spring element 12 as being non-sinuous is to distinguish over zig zag forms and includes both straight and slightly crowned wire form entirely disposed at the plane of deflection.

I claim:
1. In a spring cushion construction, spaced front and rear frame portions, a spring element extending across said frame portions and connected thereto and having linear spring load supporting portion in the form of a non-sinuous wire portion entirely disposed in its plane of deflection, front and rear torsion structures associated with said spring element and in the form of oppositely directed generally U-shaped loops located to be intersected by said plane of deflection, said U-shaped loops of said front and rear torsion structures being disposed in intersecting planes normal to said planes of deflection to provide fish mouth shaped structures at opposite ends of said spring elements and facing in opposite directions, said torsion structures having end attachment foot portions attached to said frame portions, transverse torsion bar portions integral with said linear spring portion and located at the junction between said linear spring portion and said fish mouth torsion structures, the foot of the said rear torsion structure being suspended from its frame portion at a point above the intersection of said planes in which its loops are located.

2. In a spring cushion construction, spaced frame portions, a spring element bridging said frame portions, said element comprising a straight wire portion, torsion structure connected at opposite ends of said straight wire portion in off-set relation thereto, said torsion structure having foot portions connected to said frame portions, one of said torsion structures resting upon its associated foot structure, and the other of said torsion structures being suspended from its foot structure.

3. In a spring cushion construction, spaced frame portions, a spring element bridging said frame portions, said element comprising a straight wire portion, torsion structures connected with the opposite ends of said straight wire portion in off-set relation thereto, one of said torsion structures resting upon its associated frame portion and the other of said torsion structures being suspended from its associated frame portion.

4. In a cushion spring construction, spaced frame portions, a spring element for bridging said frame portions in the form of a relatively straight wire portion and having ends thereof supported by off-set torsion column portions, said column portions having attachment foot portions which are normally spaced at greater distance than the spacing of said frame portions with said spring element in an unstressed condition, means carried by said frame portions for attaching said foot portions to said frame portions and in which said foot portions are received upon stressing said column portions inwardly toward each other to bow said straight wire portion in the plane of deflection under load supporting conditions.

5. In a cushion spring construction, spaced frame portions, a wire spring element bridging said frame portions, said element having a centrally located linear spring portion and an integral terminal torsion structure portion, said structure portion being disposed in off-set relation to said linear spring portion, said linear spring portion and said torsion structure portion having a common transverse torsion bar portion at one end of said linear spring portion, said torsion structure being disposed to one side of said linear spring portion in the form of a fish mouth and defined by integral oppositely facing U-loop portions disposed in intersecting planes, the U-loop at the outermost end of said torsion structure having a leg substantially parallel to said common torsion bar and forming a second torsion bar, means on one of said frame portions for giving hinge type support to said second torsion bar, and a lever arm extension on said second torsion bar abutting said last frame portion at a point spaced from the longitudinal axis of said second torsion bar to place said second torsion bar under torsion upon deflection of said linear spring portion.

References Cited in the file of this patent

UNITED STATES PATENTS 2,830,654     Neely _____ Apr. 15, 1958